(12) United States Patent
Nishimoto et al.

(10) Patent No.: US 6,270,615 B1
(45) Date of Patent: Aug. 7, 2001

(54) METHOD TO IMPROVE THREAD DRAWING WHEN MANUFACTURING A VEHICLE LAMP BY USING A HOT PLATE MELT-BONDING METHOD

(75) Inventors: Kenji Nishimoto, Miki; Yoshihiko Hashimoto, Ibaraki, both of (JP)

(73) Assignee: Kaneka Corporation, Osaka (JP)

(*) Notice: Subject to any disclaimer, the term of this patent is extended or adjusted under 35 U.S.C. 154(b) by 0 days.

(21) Appl. No.: 09/198,580

(22) Filed: Nov. 24, 1998

(30) Foreign Application Priority Data

Nov. 26, 1997 (JP) .................................................. 9-324133
Oct. 23, 1998 (JP) ................................................ 10-301175

(51) Int. Cl.$^7$ ...................................................... B32B 31/20
(52) U.S. Cl. ...................... 156/309.9; 362/507; 525/74; 525/83
(58) Field of Search ...................... 156/309.9; 362/507; 525/74, 83

(56) References Cited

U.S. PATENT DOCUMENTS 4,442,264 * 4/1984 Zabrocki et al. ...................... 525/74
4,761,463 * 8/1988 Matsumoto et al. .................... 525/74
4,985,496 * 1/1991 Kishida et al. ......................... 525/74

FOREIGN PATENT DOCUMENTS 09012902A   1/1997   (JP) .
09087471A   3/1997   (JP) .
09087472A   3/1997   (JP) .

* cited by examiner

Primary Examiner—John J. Gallagher
(74) Attorney, Agent, or Firm—Armstrong, Westerman, Hattori, McLeland & Naughton LLP

(57) ABSTRACT

In manufacturing a vehicle lamp by a hot plate melt-bonding method whereby a lamp body comprising thermoplastic resin is melted by pressing onto it a heated hot plate, then joining the lamp body and a lamp lens by press-fixing the melted part onto the lamp lens, improvement is effected in respect of thread drawing of the resin constituting the lamp body by employing a lamp body that is molded of a resin composition (C) as chief constituent whereof a total of 100 weight parts consist of 80~5 weight parts of a specified graft copolymer (A) obtained by graft polymerization of an α,β-unsaturated acid glycidyl ester compound and 20~95 weight parts of vinyl copolymer (B).

9 Claims, 1 Drawing Sheet

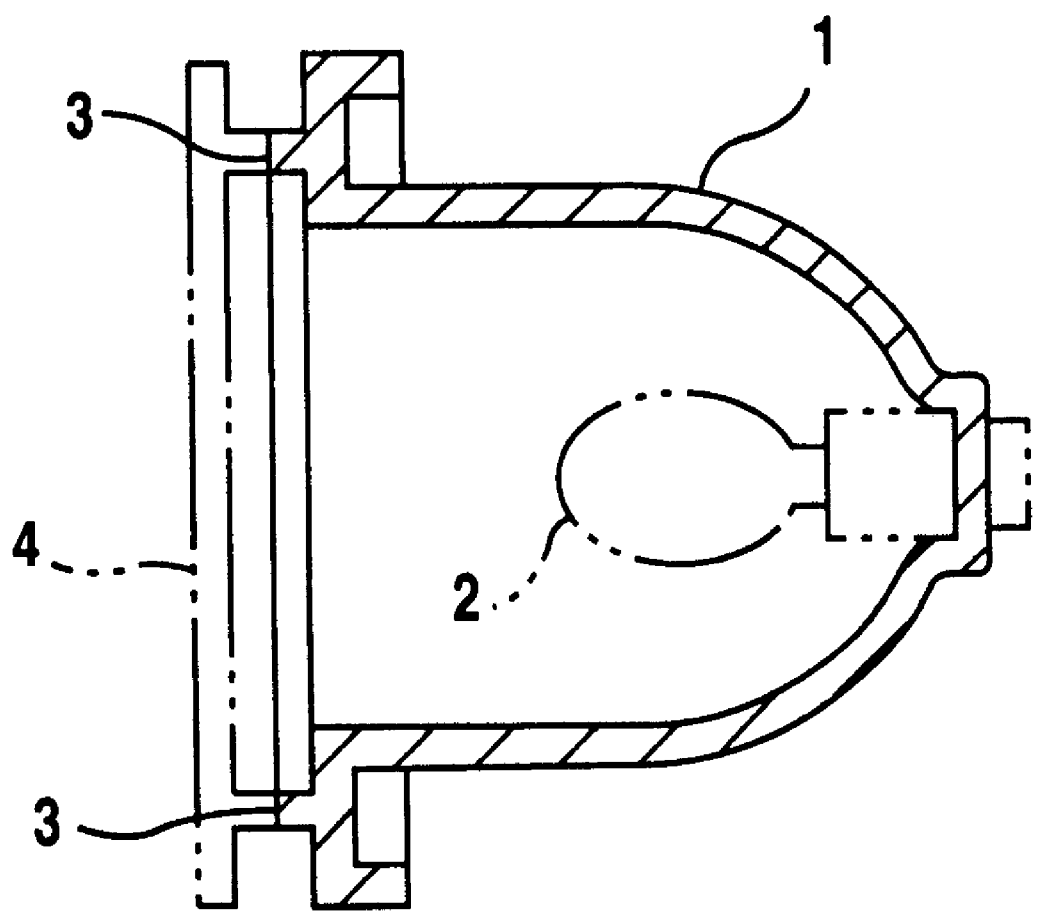

METHOD TO IMPROVE THREAD DRAWING WHEN MANUFACTURING A VEHICLE LAMP BY USING A HOT PLATE MELT-BONDING METHOD

BACKGROUND OF THE INVENTION

1. Field of the Invention

The present invention relates to a method of manufacturing a lamp employed for vehicle use such as headlamp, turn signal lamp, or stop-lamp, in which a lamp lens is joined to a lamp body made of synthetic resin.

2. Description of the Related Art

As a method of joining a lamp lens to a lamp body consisting of synthetic resin, the method of fixing these two together by using an adhesive could be employed. However, in view of environmental problems, the so-called hot plate melt-bonding method, in which the lamp body, typically consisting of a thermoplastic resin such as ABS resin, is melted by pressing a hot plate onto it and the molten part is then press-fixed onto a lamp lens consisting of methyl methacrylate resin etc. is becoming more widely adopted since, unlike the method in which fixing is effected using adhesive, it employs no solvent at all. However, with such a hot plate melt-bonding method, there was sometimes the problem that, on separating the hot plate after using the hot plate to melt the thermoplastic resin constituting the lamp body made of ABS resin or the like, the molten resin gets drawn out in the form of a thread (hereinbelow this is referred to as "thread drawing") which adheres to the surface of the molding of the lamp lens or lamp body, adversely affecting its appearance. As a method of improving the situation regarding thread drawing in this hot plate melt-bonding method, for example Early Japanese Patent Publication H. 9-12902 proposes the method of adding a fluorine resin such as polytetrafluoroethylene to the thermoplastic resin such as polycarbonate or ABS resin. However, with this method, the cost of the vehicle lamp that is manufactured is increased and also, since the external slipperiness of fluorine resins is high, if the added amount is large, when the resin is extruded from the extrusion molding machine in extrusion manufacture of the pellets for molding, so-called surging occurs, adversely affecting productivity. Furthermore, secondary processing may be adversely affected in that there may be poor adhesion of the evaporated film or coating when vacuum evaporation is performed onto the inner surface of the molded lamp body or its outer surface is coated.

SUMMARY OF THE INVENTION

With the foregoing in view, when manufacturing a vehicle lamp by joining a lamp body to a lamp lens using the hot plate melt-bonding method, it is an object of the present invention to improve the situation regarding thread drawing of the resin used to constitute the lamp body without either increasing manufacturing costs or impairing secondary processing capability.

As a result of meticulous study aimed at achieving this object, the inventors arrived at the present invention by discovering that thread drawing when manufacturing a vehicle lamp by joining a lamp body and lamp lens by the hot plate melt-bonding method could be greatly improved with a resin composition obtained by blending a graft copolymer containing specific constituents with a vinyl copolymer.

Specifically, according to the present invention, when manufacturing a vehicle lamp by melting a lamp body comprising thermoplastic resin by pressing onto it a heated hot plate, then joining the lamp body and a lamp lens by press-fixing the melted part onto the lamp lens, as the lamp body there is employed a lamp body molded by a resin composition (C) as chief constituent whereof a total of 100 weight parts consist of 80~5 weight parts of the graft copolymer (A) specified below and 20~95 weight parts of the vinyl copolymer (B) specified below:

(A) graft copolymer obtained by graft polymerization of 80~5 weight parts of a mixture of monomers with 20~95 weight parts of rubber-like polymer; said monomer mixture comprising 99.9~60 weight % of one or two or more vinyl compounds selected from vinyl cyanide compounds, aromatic vinyl compounds and alkyl (meth)acrylate compounds, 0~30 weight % of another copolymerizable vinyl compound, and 0.1~40 weight % of an $\alpha,\beta$-unsaturated acid glycidyl ester compound;

(B) vinyl copolymer obtained by reacting 10~40 weight % of a vinyl cyanide compound with 60~90 weight % of an aromatic vinyl compound and 0~30 weight % of another copolymerizable vinyl compound.

What is particularly important in the present invention is the graft copolymer (A) in the resin composition used for molding the lamp body. Specifically, the graft copolymer (A) that is employed in the present invention is a graft copolymer obtained by, in graft polymerization of 80~5 weight parts of a mixture of monomers with 20~95 weight parts of rubber-like polymer, reacting, as necessary constituent, 0.1~40 weight parts, preferably 0.5~30 weight parts, and even more preferably 5~20 weight parts, of $\alpha,\beta$-unsaturated acid glycidyl ester compound, with 99.9~60 weight % of one or two or more vinyl compounds selected from vinyl cyanide compounds, aromatic vinyl compounds, or alkyl(meth)acrylate compounds, more preferably 99.9~60 weight % of vinyl compounds comprising 0~40 weight % of vinyl cyanide compounds, 60~90 weight % of aromatic vinyl compounds, or 0~30 weight % of alkyl(meth)acrylate compounds, and 0~30 weight t of other copolymerizable vinyl compounds.

In this graft copolymer (A) it is undesirable that the rubber-like polymer should be less than 20 weight parts since this lowers the impact strength of the lamp body or that it should exceed 95 weight parts since this results in extremely poor fluidity of the resin. Furthermore it is undesirable that the amount of $\alpha,\beta$-unsaturated acid glycidyl ester compound in the monomer mixture that is graft-polymerized with the rubber-like polymer should be less than 0.1 weight %, since a sufficient improvement effect in respect of thread drawing when the lamp lens is joined by the hot plate melt-bonding method is then not obtained, or that it should exceed 40 weight %, since this results in reduced fluidity of the resin when the lamp body is molded and reduced impact resistance of the molded lamp body.

There is no particular restriction on the rubber-like polymer employed in the graft copolymer (A) and examples that may be given include: diene rubbers such as polybutadiene rubber, styrene-butadiene rubber (SBR), acrylonitrile butadiene rubber (NBR), or butyl acrylate—butadiene rubber; acrylic rubbers such as butyl acrylate rubber, butadiene—butyl acrylate rubber, acrylic acid 2—ethylhexyl butylacrylate rubber, methacrylic acid—ethylhexyl butylacrylate rubber, stearyl acrylate—butylacrylate rubber, dimethyl siloxane butylacrylate rubber, or silicone/butylacrylate composite rubber; polyolefin rubber polymers such as ethylene—propylene rubber or ethylene—propylene diene rubber; or silicone rubber polymers such as polymethyl siloxane rubber; these may be used alone or in a combination of two or more. Preferably the mean grain size of these rubber polymers is 0.05~1 $\mu$m, and even more preferably 0.07~0.4 $\mu$m. Rubber-like polymers manufactured by the coagulation dilation method using an acidic group-containing latex could also be employed.

Examples of glycidyl ester compounds of α,β-unsaturated acids that undergo graft polymerization with the rubber-like polymer include glycidyl acrylate, glycidyl methacrylate, and glycidyl ethacrylate; one or two or more of these may be employed.

As the (vinyl cyanide compound) used in graft copolymer (A) and vinyl copolymer (B), (acrylonitrile or methacrylonitrile may be mentioned as examples; as the aromatic vinyl compound, styrene, α-methylstyrene, p-methylstyrene, p-isopropylstyrene, chlorostyrene, or bromostyrene may be mentioned as examples. Also, as the alkyl (meth)acrylate compound, methyl (meth)acrylate, ethyl (meth)acrylate, or butyl (meth) acrylate may be mentioned as examples. Furthermore, as the other copolymerizable vinyl compound, acrylic acid, methacrylic acid, maleimide compounds such as for example N-phenyl maleimide, vinyl acetic acid, or ethyl vinyl ether may be mentioned as examples. These may be used alone or as a combination of two or more.

The graft copolymer (A) and vinyl copolymer (B) are preferably obtained by emulsion polymerization but they may be manufactured by any method of polymerization. For example,they may be manufactured by any method of polymerization such as the generally known bulk polymerization method, solution polymerization method, suspension polymerization method, emulsion—suspension polymerization, or emulsion—bulk polymerization method, so long as they can be controlled to a composition within the target range of the present invention. For example, in the case of graft copolymer (A), the monomer mixture may be polymerized by a radical initiator in aqueous medium in the presence of a rubber-like polymer. In this process, the mixture of monomers that is made to undergo graft polymerization may be employed in the form of a mixture or may be employed separately. Furthermore, there is no particular restriction on the method of adding the monomer mixture, which may all be added at once or added gradually.

As the radical initiator, well-known initiators such as pyrolytic initiators such as potassium persulfate or redox initiators such as Fe—reducing agent—organic peroxide may be employed.

Apart from these, polymerization accelerators, polymerization adjusters, or emulsifiers may be suitably selected for use. A polymerization temperature of 30~90° C. is preferred.

The blending ratio of graft copolymer (A) and copolymer (B) in the resin composition constituting the lamp body of the present invention may be suitably determined in order to obtain the target physical properties but the graft copolymer (A) is 80~5 weight parts, preferably 60~10 weight parts and the vinyl copolymer (B) is 20~95 weight parts, preferably 40~90 weight parts. Also, it is possible to polymerize the vinyl copolymer (B) in the same reaction vessel after polymerizing graft copolymer (A).

The limiting viscosity of the resin composition constituting the lamp body whose chief constituents are graft copolymer (A) and vinyl copolymer (B) is preferably in the range 0.25~1.5 (dl/g) (N,N-dimethylformamide solution, 30° C.) for the methyl ethyl ketone soluble constituent.

Ordinary known methods may used to obtain a resin composition from the graft copolymer (A) and the latex of vinyl copolymer (B). For example it may be obtained by coagulation using an inorganic salt such as calcium chloride, magnesium chloride, or ammonium sulfate, or an acid such as hydrochloric acid, sulfuric acid, acetic acid, or phosphoric acid. Also, if necessary, when performing resin blending, the ordinary methods, using for example a blender such as a Henschel mixer or ribbon blender may be employed, and suitable amounts of desired stabilizers, anti-oxidants, ultraviolet absorbing agents, anti-static agents, lubricants, pigments, inorganic fillers, or glass fibers may also be employed. In particular, phenol-based, sulfur-based, phosphorus-based or hindered amine-based stabilizers used in styrene resins, benzophenone-based or benzotriazole-based ultraviolet absorbing agents and lubricants such as organopolysiloxanes, aliphatic hydrocarbons, or esters of high fatty acids and high alcohols may be employed in order to obtain better performance of the molding resin. These stabilizers and lubricants may be employed either alone or as mixtures of two or more.

Also, in the resin composition constituting the lamp body, in addition to the above graft copolymer (A) and vinyl copolymer (B), ordinary ABS resin, AS resin, polycarbonate resin, polyvinyl chloride resin, polyamide resin, PET resin, or PBT resin etc. may be blended and used.

In the present invention, after melting a lamp body molded from a resin composition as above by pressing onto it a heated hot plate, a vehicle lamp is manufactured by joining the lamp body and lamp lens by press-fixing the molten portion onto the lamp lens. It is desirable that this should be performed with the temperature of the hot plate raised to 300~500° C. It is also desirable that a (lens consisting of methyl methacrylate resin) should be employed as the lamp lens that is joined to the lamp body.

With the present invention, compared with the case where the ordinary ABS resin that is used as the material of conventional lamp bodies is used, a great improvement can be achieved in respect of thread drawing of the resin constituting the lamp body when a vehicle lamp is manufactured by joining a lamp body and lamp lens by press-fixing the molten portion onto the lamp lens after melting by pressing onto the lamp body a heated hot plate. This is particularly useful in the manufacture of vehicle lamps such as head lamps, winkers, and stop lamps.

BRIEF DESCRIPTION OF THE DRAWINGS

The sole FIGURE is a cross-sectional view of a lamp body product used in the evaluation of thread drawing.

DESCRIPTION OF PRACTICAL EXAMPLES

The present invention is described specifically below with reference to practical examples but the present invention is not restricted to these practical examples. In the description of the practical examples, unless otherwise specified, "parts" means weight parts and "%" means weight %.

(1) Manufacture of Graft Copolymer (A)

The following substances were introduced into a reactor equipped with a stirrer, a ref lux cooler, a monomer introduction port and a thermometer.

| | |
|---|---|
| Pure water | 250 parts |
| Rubber-like polymer | the types and amounts specified in Table 1 |
| Sodium formaldehyde sulfoxylate | 0.3 part |
| Ferrous sulfate | 0.0025 part |
| Sodium ethylene diamine tetraacetate | 0.01 part |

The reactor was raised in temperature to 60° C. whilst stirring under a current of nitrogen. After the temperature of 60° C. is reached, the monomer mixtures shown in Table 1 were added dropwise continuously for 5 hours. After the addition was completed, stirring was continued for a further hour at 60° C. to complete polymerization.

TABLE 1

Graft Copolymer (A)

|  |  | Practical Examples |  |  |  |  |  | Comparative Examples |  |
|---|---|---|---|---|---|---|---|---|---|
|  |  | A1 | A2 | A3 | A4 | A5 | A6 | A7 | A8 |
| Rubber-like polymer | PBd (parts) | 30 | 60 | 70 | 80 | — | — | 60 | 70 |
|  | SBR (parts) | — | — | — | — | 70 | — | — | — |
|  | PBA (parts) | — | — | — | — | — | 70 | — | — |
| Monomer mixture | Blending amount (parts) | 70 | 40 | 30 | 20 | 30 | 30 | 40 | 30 |
|  | GMA (%) | 20 | 5 | 10 | 15 | 15 | 15 | — | — |
|  | AN (%) | 10 | 20 | 20 | 15 | 15 | 15 | 30 | 30 |
|  | St (%) | 65 | 75 | 70 | 70 | 70 | 70 | 70 | 70 |
|  | MMA (%) | 5 | — | — | — | — | — | — | — |
| CHP | (parts) | 0.3 | 0.3 | 0.3 | 0.2 | 0.3 | 0.3 | 0.3 | 0.3 |
| tDM | (parts) | 0.2 | 0.2 | — | — | — | — | 0.2 | — |

PBd: polybutadiene
SBR: (styrene/butadiene = 25/75) copolymer
PBA: (butyl acrylate/allyl methacrylate = 99/1) copolymer
GMA: glycidyl methacrylate
AN: acrylonitrile
St: styrene
MMA: methyl methacrylate
CHP: cumene hydroperoxide
tDM: t-dodecyl mercaptan

(2) Manufacture of Vinyl Copolymer (B)

The following substances were introduced into a reactor equipped with a stirrer, a reflux cooler, a nitrogen introduction port, a monomer introduction port and a thermometer.

| Pure water | 250 parts |
|---|---|
| Sodium laurate | 3 parts |
| Sodium formaldehyde sulfoxylate | 0.4 part |
| Ferrous sulfate | 0.0025 part |
| Sodium ethylene diamine tetraacetate | 0.01 part |

The reactor was raised in temperature to 60° C. whilst stirring under a current of nitrogen. After the temperature of 60° C. is reached, the monomers (I) shown in Table 2 were added. After emulsifying sufficiently, the monomers (II) shown in Table 2 were added dropwise for 6 hours continuously. After completing the addition, stirring was continued for a further hour at 60° C. to complete polymerization.

TABLE 2

Vinyl Copolymer (B)

|  |  | Practical Examples |  |  |
|---|---|---|---|---|
|  |  | B1 | B2 | B3 |
| Monomer (I) | αMSt (%) | — | — | 7.5 |
|  | tDM (parts) | — | — | 0.2 |
| Monomer (II) | AN (%) | 30 | 20 | 22 |
|  | αMSt (%) | — | 50 | 3 |
|  | MMA (%) | — | 10 | — |
|  | St (%) | 70 | 20 | — |
|  | CHP (parts) | 0.5 | 0.5 | 0.5 |
|  | tDM (parts) | 0.3 | 0.3 | 0.2 |

αMSt: α-methyl styrene

(3) Manufacture of Vehicle Lamp Body Resin Composition (C) and Evaluation of Thread Drawing Graft copolymer (A) and vinyl copolymer (B) manufactured in (1) and (2) above were mixed in latex condition respectively in the ratios (solids) set out in Table 3, antioxidants were added to this mixed latex and coagulation was effected with calcium chloride, after which the powder obtained by heating, dehydrating, washing with water and drying was pelletized using an extrusion machine (single-shaft extrusion machine of 40 mmφ manufactured by Osaka Seiki Ltd.) at 250° C. Using the pellets obtained, ASTM No. 1 dumbbells and the lamp body product shown in FIG. 1 were molded at a temperature of 250° C. using a 150 ton injection molding machine (made by FANUC). The evaluations of thread drawing set out below were conducted using these. The results are shown in Table 3.

(4) Evaluation of Thread Drawing using Dumbbell Test Pieces

The length [cm] of the thread produced at the molten surface when the ASTM No. 1 dumbbell obtained by injection molding was raised with a speed of 500 mm/min after pressing this dumbbell for 10 seconds with a pressure of 10 kgf/cm² onto a flat aluminum plate heated to 320° C. was measured.

(5) Evaluation of Thread Drawing using Lamp Body Product

An evaluation was conducted as to whether or not thread drawing occurred at the molten face on raising at a speed of 50 mm/min after pressing the lamp body product shown in the drawing obtained by injection molding onto a hot plate made of aluminum with a pressure of 10 kg/cm² and a melt-bonding temperature of 320° C., using a hot plate melt-bonding machine. In the drawing, shown are lamp body 1, lamp/bulb 2, melt-bonding face 3 and lamp lens 4.

TABLE 3

Resin Composition (C)

| | | Practical Examples | | | | | | Comparative Examples | |
|---|---|---|---|---|---|---|---|---|---|
| | | C1 | C2 | C3 | C4 | C5 | C6 | C7 | C8 |
| Graft copolymer (A) | A1 | 70 | — | — | — | — | — | — | — |
| | A2 | — | 30 | — | — | — | — | — | — |
| | A3 | — | — | 30 | — | — | — | — | — |
| | A4 | — | — | — | 20 | — | — | — | — |
| | A5 | — | — | — | — | 30 | — | — | — |
| | A6 | — | — | — | — | — | 30 | — | — |
| | A7 | — | — | — | — | — | — | 30 | — |
| | A8 | — | — | — | — | — | — | — | 30 |
| Copolymer (B) | B1 | 30 | 70 | 70 | — | — | 70 | 70 | 70 |
| | B2 | — | — | — | — | 70 | — | — | — |
| | B3 | — | — | — | 80 | — | — | — | — |
| Limiting viscosity [dl/g] | | 0.58 | 0.53 | 0.71 | 0.58 | 0.60 | 0.65 | 0.54 | 0.67 |
| Thread drawing evaluation using dumbbell test piece [cm] | | 0.0 | 0.0 | 0.0 | 0.1 | 0.0 | 0.0 | 2.8 | 1.9 |
| Thread drawing evaluation using lamp body product | | ○ | ○ | ○ | ○ | ○ | ○ | X | X |

Limiting viscosity: Limiting viscosity of methyl ethyl ketone soluble constituent (N,N'-dimethyl formamide solution, 30° C.)
Thread drawing evaluation using lamp body product:
○ . . . no thread drawing
X . . . thread drawing observed.

As is clear from the results of Table 3, with the present invention, compared with the case where a lamp body is employed consisting of the conventionally employed ABS resin composition of the comparative example, a considerable improvement is achieved in regard to thread drawing in the hot plate melt-bonding method.

What is claimed is:

1. A method of decreasing thread drawing of a thermoplastic resin in the manufacture of a vehicle lamp comprising the steps of partially melting a lamp body composed of said thermoplastic resin by pressing onto it a heated hot plate, then removing the heated hot plate from the lamp body, then joining the lamp body and a lamp lens by press-fixing the melted part of the lamp body onto a methyl methacrylate resin lamp lens,
   wherein a resin composition (C) in an amount of 100 weight parts and consisting of 80~5 weight parts of the graft copolymer (A) specified below and 20~95 weight parts of the vinyl copolymer (B) specified below is used as the thermoplastic resin:
   (A) a graft copolymer obtained by graft polymerization of 80~5 weight parts of a mixture of monomers with 20~95 weight parts of rubber-like polymer having an average particle size of 0.05~1 μm; said monomer mixture comprising 99.9~60 weight % of one or two or more vinyl compounds selected from vinyl cyanide compounds, aromatic vinyl compounds and alkyl (meth)acrylate compounds, 0~30% of another copolymerizable vinyl compound, and 0.1~40 weight parts of an α,β-unsaturated acid glycidyl ester compound;
   (B) a vinyl copolymer obtained by reacting 10~40 weight % of a vinyl cyanide compound with 60~90 weight % of an aromatic vinyl compound and 0~30 weight % of another copolymerizable vinyl compound;
   wherein melting of the lamp body is effected by maintaining the hot plate pressed onto the lamp body at a temperature of 300~500° C.

2. The method of manufacturing a vehicle lamp according to claim 1, wherein the monomer mixture of said graft copolymer (A) comprises: 99.9~60 weight % of vinyl compound comprising 0~40 weight % of vinyl cyanide compound, 60~90 weight % of aromatic vinyl compound and 0~30 weight % of alkyl (meth)acrylate compound; 0~30 weight % of another copolymerizable vinyl compound; and 0.1~40 weight % of an α,β-unsaturated acid glycidyl ester compound.

3. The method of manufacturing a vehicle lamp according to claim 1, wherein the content of glycidyl ester compound in the monomer mixture of said graft copolymer (A) is 5~20 weight %.

4. The method of manufacturing a vehicle lamp according to claim 1, wherein said glycidyl ester compound is glycidyl methacrylate.

5. The method of manufacturing a vehicle lamp according to claim 1, wherein said rubber-like copolymer is at least one selected from the group consisting of polybutadiene rubber, styrene—butadiene rubber, acrylonitrile butadiene rubber, butyl acrylate—butadiene rubber; butyl acrylate rubber, butadiene—butyl acrylate rubber, acrylic acid 2—ethylhexyl—butylacrylate rubber, methacrylic acid 2—ethylhexyl—butylacrylate rubber, stearyl acrylate—butylacrylate rubber, dimethyl siloxane—butylacrylate rubber, silicone/butylacrylate composite rubber; ethylene—propylene rubber or ethylene—propylene—diene rubber; or polymethyl siloxane.

6. The method of manufacturing a vehicle lamp according to claim 1, wherein said vinyl cyanide compound is at least one of acrylonitrile and methacrylonitrile.

7. The method of manufacturing a vehicle lamp according to claim 1, wherein said aromatic vinyl compound is at least one selected from the group consisting of styrene, α-methylstyrene, p-methylstyrene, p-isopropylstyrene, chlorostyrene, or bromostyrene.

8. The method of manufacturing a vehicle lamp according to claim 1, wherein said alkyl (meth)acrylate is at least one selected from the group consisting of methyl (meth)acrylate, ethyl (meth)acrylate, or butyl (meth)acrylate.

9. The method of manufacturing a vehicle lamp according to claim 1, wherein said other copolymerlzable vinyl compound is at least one selected from the group consisting of: acrylic acid methacrylic acid, N-phenyl maleimide, vinyl acetate and ethyl vinyl ether.

* * * * *